(12) United States Patent
Brahmkshatriya et al.

(10) Patent No.: US 12,527,808 B2
(45) Date of Patent: Jan. 20, 2026

(54) COMPOUNDS USEFUL TO TREAT PAIN

(71) Applicant: Amneal Pharmaceuticals LLC, Bridgewater, NJ (US)

(72) Inventors: Pathik Subhashchandra Brahmkshatriya, Ahmedabad (IN); Vishal Bharatbhai Unadkat, Ahmedabad (IN); Vishalgiri Gunvantgiri Goswami, Ahmedabad (IN); Heta Nishil Pandya, Ahmedabad (IN); Sandip Pareshbhai Mehta, Ahmedabad (IN)

(73) Assignee: AMNEAL PHARMACEUTICALS LLC, Bridgewater, NJ (US)

( * ) Notice: Subject to any disclaimer, the term of this patent is extended or adjusted under 35 U.S.C. 154(b) by 796 days.

(21) Appl. No.: 17/638,332

(22) PCT Filed: Aug. 27, 2020

(86) PCT No.: PCT/IB2020/058010
§ 371 (c)(1),
(2) Date: Feb. 25, 2022

(87) PCT Pub. No.: WO2021/038487
PCT Pub. Date: Mar. 4, 2021

(65) Prior Publication Data
US 2022/0288093 A1  Sep. 15, 2022

(30) Foreign Application Priority Data
Aug. 27, 2019 (IN) .............................. 201921034555

(51) Int. Cl.
*A61K 31/655* (2006.01)
(52) U.S. Cl.
CPC .................................. *A61K 31/655* (2013.01)
(58) Field of Classification Search
CPC .................................................... A61K 31/655
See application file for complete search history.

(56) References Cited

U.S. PATENT DOCUMENTS

| | | |
|---|---|---|
| 2004/0214753 A1 | 10/2004 | Britten et al. |
| 2006/0264912 A1 | 11/2006 | McIntyre et al. |
| 2007/0208134 A1 | 9/2007 | Hunter et al. |
| 2014/0128399 A1 | 5/2014 | Abraham et al. |

FOREIGN PATENT DOCUMENTS

CN        108635335 A    10/2018

OTHER PUBLICATIONS

J. G. Cannon, Chapter Nineteen in Burger's Medicinal Chemistry and Drug Discovery, Fifth Edition, vol. I: Principles and Practice, Wiley-Interscience 1995, pp. 783-802. (Year: 1995).*
Gaines, Kaye K. "Phenazopyridine Hydrochloride: The Use and Abuse of an Old Standby for UTI". Medication Minute, 24(3):207-209 (2004).
Shreve et al., "Studies in Azo Dyes. I. Preparation and Bacteriostatic Properties of Azo Derivatives of 2,6-Diaminopyridine," Journal of the American Chemical Society, 65:2241-2243 (1943).
Extended European Search Report mailed Aug. 16, 2023 for corresponding European Patent Application Serial No. 20858967.1.
Tay and Grundy, "Animal Models of Interstitial Cystitis/Bladder Pain Syndrome," Frontier in Physiology, 14:1-29 (2023).
Auge et al., "Relevance of the Cyclophosphamide-Induced Cystitis Model for Pharmacological Studies Targeting Inflammation and Pain of the Bladder," European Journal of Pharmacology, 707:32-40 (2013).
Saban, "Angiogenic Factors, Bladder Neuroplasticity and Interstitial Cystitis—New Pathological Insights," Transl Androl Urol, 4(5):555-562 (2015).
Gousse et al., "Assessment of Bladder Pressure and Discomfort Symptoms: How do Overactive Bladder Differ from Interstitial Cystitis/Bladder Pain Syndrome Patients?" BMC Urology, 23(53):1-7 (2023).
International Search Report dated Apr. 1, 2021, for corresponding International Patent Application No. PCT/IS20/58010.
Written Opinion dated Apr. 1, 2021, for corresponding International Patent Application No. PCT/IS20/58010.
Aizawa, et al.; "Effects of Phenazopyridine on Rat Bladder Primary Afferent Activity, and Comparison with Lidocaine and Acetaminophen"; Neurourology and Urodynamics, vol. 29(8):1445-50, (2010).
Thomas et al.; "Excretion of Phenazopyridine and Its Metabolites in the Urine of Humans, Rats, A Mice, and Guinea Pigs"; Journal of Pharmaceutical Sciences, vol. 79(4), Apr. 1990.

* cited by examiner

*Primary Examiner* — Marcos L Sznaidman
(74) *Attorney, Agent, or Firm* — Troutman Pepper Locke LLP

(57) ABSTRACT

The present invention relates to compounds useful as bradykinin receptor antagonist, pharmaceutical composition comprising such compounds, and therapeutic use of the same. The present invention further relates to the combination of compounds useful for the therapeutic use. The present invention relates to the pharmaceutical composition comprising the compound and combination of compounds useful for treatment of urinary bladder pain, the symptomatic relief of pain, burning, urgency, frequency, and other discomforts arising from irritation of the lower urinary tract mucosa caused by infection, trauma, surgery, endoscopic procedures, or the passage of sounds or catheters.

1 Claim, 2 Drawing Sheets

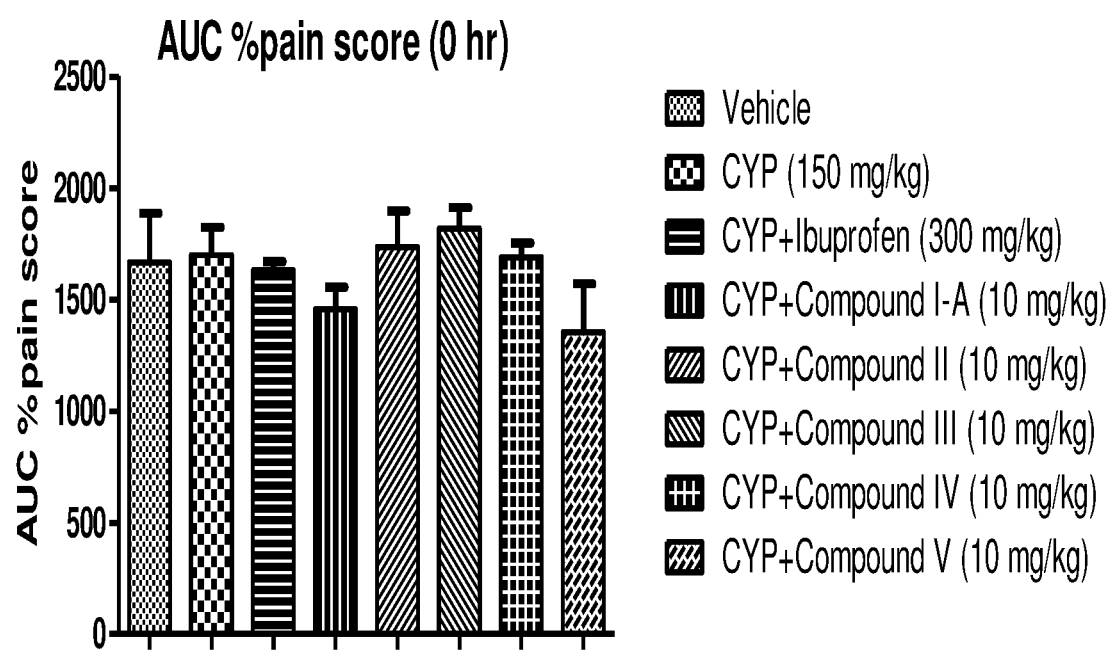
Figure 1: AUC of % pain score at 0 hr post cyclophosphamide (CYP) injection

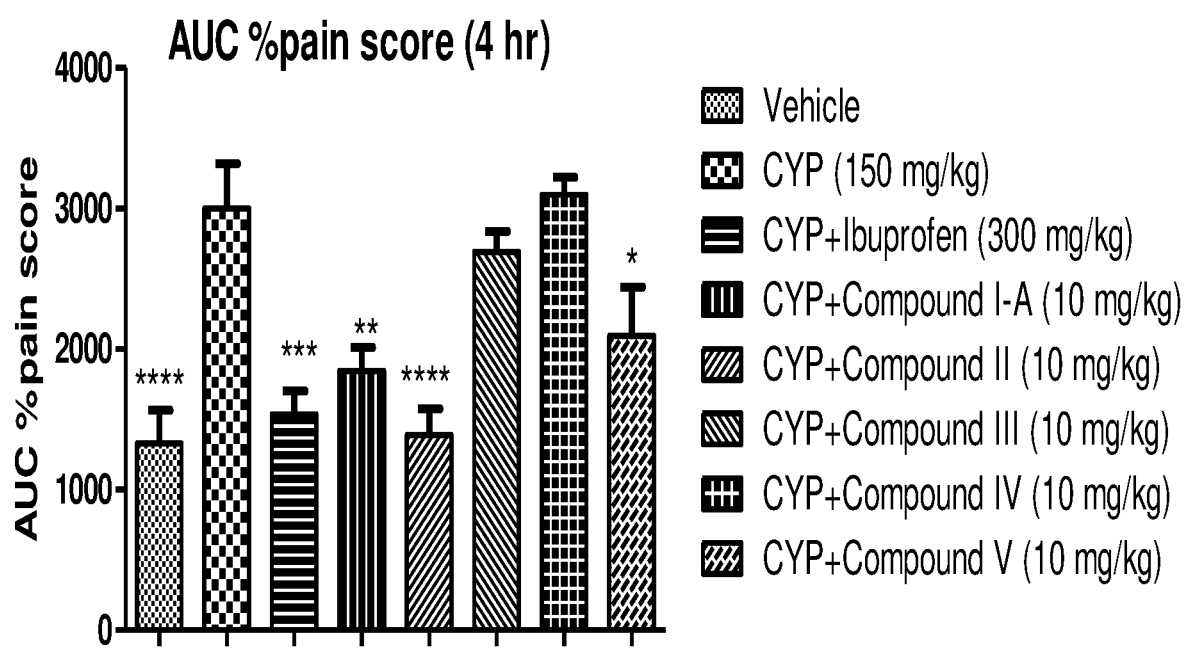
Figure 2: AUC of % pain score at 4 hr post cyclophosphamide (CYP) injection

COMPOUNDS USEFUL TO TREAT PAIN

This application is a National Stage Application under 35 U.S.C. § 371 of PCT International Application No. PCT/IB2020/058010, filed Aug. 27, 2020, which takes priority from Indian Priority Application Number IN 201921034555, filed Aug. 27, 2019, all of which are herein incorporated by reference in their entireties.

FIELD OF THE INVENTION

The present invention relates to compounds useful as bradykinin receptor antagonist, pharmaceutical composition comprising such compounds, and therapeutic use of the same.

The present invention also relates to the combination of compounds useful for the therapeutic use.

The present invention also relates to the pharmaceutical composition comprising the combination of compounds useful for the therapeutic use.

BACKGROUND OF THE INVENTION

The present invention relates to compounds useful as bradykinin receptor antagonist, pharmaceutical compositions comprising such compounds, and therapeutic use of the same.

Bradykinins (BK) are naturally occurring vasoactive peptide hormones, which are known to be important mediators of a variety of biological effects, including cardiovascular homeostasis, inflammation, and nociception. The kinins interact with two G-protein-coupled receptors, termed B1 and B2 receptors (B1R and B2R). Overproduction of kinins under pathophysiological conditions is implicated in several disorders, including pain, inflammation, hypotension, asthma, colitis, pancreatitis, rhinitis, sepsis, and rheumatoid arthritis. Therefore, antagonists of BK receptors may offer a novel approach to the treatment of these disorders, among which perhaps the most promising area is in the treatment of pain.

Pain is a complex multidimensional concept that facilitates the initiation of the signaling cascade in response to any noxious stimuli. Numerous types of receptors are activated in pain sensations which vary in their signaling pathway. These signaling pathways can be regarded as a site for modulation of pain by targeting the pain transduction molecules to produce analgesia out of several pain syndromes.

The pathogenesis of Interstitial Cystitis/Bladder Pain Syndrome (IC/BPS) is not clearly known and often have comorbidities of other chronic pelvic pain conditions, such as IBS and endometriosis, as well as more systemic pain conditions. Peripheral inflammation produces multiple inflammatory mediators, such as bradykinin, prostaglandins (PGE2), purines (ATP), proteases and NGF that act on their cognate receptors expressed in nociceptive sensory neurons to activate intracellular signal transduction pathways.

Therefore, blocking bradykinin receptor has pharmacological importance to treat various diseases associated with inflammation. Thus, the present invention is directed to bradykinin receptor inhibitors and their composition useful in the treatment of pathogenesis involving the inflammation.

SUMMARY OF THE INVENTION

According to a first aspect, the present invention provides compounds useful for treating the condition or symptoms associated with bradykinin receptor antagonism.

In one aspect, the present invention provides a pharmaceutical composition comprising compound I:

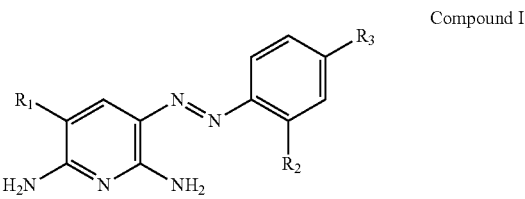

Compound I pharmaceutically acceptable salts, solvates thereof; and a pharmaceutically acceptable excipient; wherein $R_1$, $R_2$ and $R_3$ can be selected independently from hydrogen and hydroxyl group; with proviso that when $R_1$, $R_2$ and $R_3$ are hydrogen, the said composition does not include oral composition.

In another aspect, the present invention provides a method for the treatment of a bradykinin receptor mediated urinary bladder pain comprising administration of bradykinin receptor antagonist; where in the method comprises administering a therapeutically effective amount of a compound I; pharmaceutically acceptable salts, solvates thereof; wherein $R_1$, $R_2$ and $R_3$ can be selected independently from hydrogen and hydroxyl group; with proviso that when $R_1$, $R_2$ and $R_3$ are hydrogen, the said method of administration of the compound does not include oral composition.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a therapeutically effective amount of compound (I); pharmaceutically acceptable salts, solvates thereof; wherein $R_1$, $R_2$ and $R_3$ can be selected independently from hydrogen and hydroxyl group; with proviso that when $R_1$, $R_2$ and $R_3$ are hydrogen, the administration does not include oral composition.

In another aspect, the present invention provides a pharmaceutical composition comprising at least one compound selected from

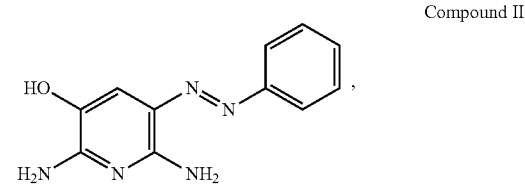

Compound II

,

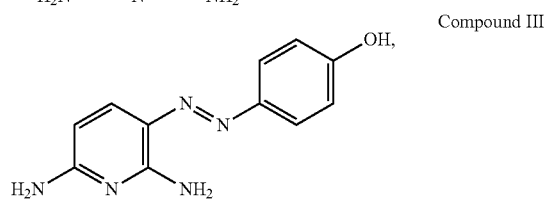

Compound III

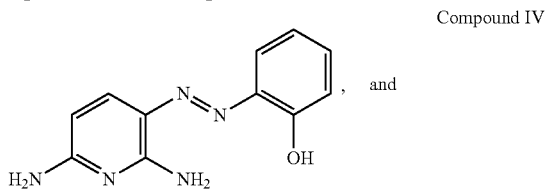

Compound IV

, and

-continued

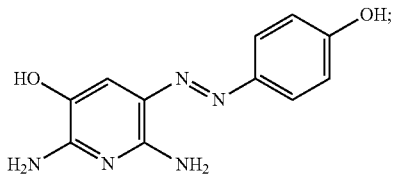

Compound V pharmaceutically acceptable salts, solvates thereof; and pharmaceutically acceptable excipients.

In another aspect, the present invention provides a pharmaceutical composition comprising at least two compounds selected from group consisting of compound II, compound III, compound IV, and compound V; pharmaceutically acceptable salts, solvates thereof; and pharmaceutically acceptable excipients.

In another aspect, the present invention provides a pharmaceutical composition comprising at least three compounds selected from group consisting of compound II, compound III, compound IV, and compound V; pharmaceutically acceptable salts, solvates thereof; and a pharmaceutically acceptable excipients.

In another aspect, the present invention provides a pharmaceutical composition comprising compound II, compound III, compound IV, and compound V; pharmaceutically acceptable salts, solvates thereof; and pharmaceutically acceptable excipients.

In another aspect, the present invention provides a pharmaceutical composition comprising combination of compound I-A

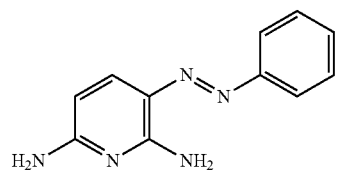

Compound I-A and at least one compound selected from group consisting of compound II, compound III, compound IV and compound V; pharmaceutically acceptable salts, solvates thereof and pharmaceutically acceptable excipients.

In another aspect, the present invention provides a method for the prevention or treatment of a bradykinin receptor mediated urinary bladder pain comprising administration of bradykinin receptor antagonist; where in the method comprises administering a combination of therapeutically effective amount of compound I-A; and at least one compound selected from group consisting of compound II, compound III, compound IV and compound V; and pharmaceutically acceptable salts, solvates thereof.

In another aspect, the present invention provides a method for the prevention or treatment of a bradykinin receptor mediated urinary bladder pain comprising administration of bradykinin receptor antagonist; where in the method comprises administering a pharmaceutical composition comprising compound I-A; and at least one compound selected from group consisting of compound II, compound III, compound IV and compound V; pharmaceutically acceptable salts, solvates thereof and a pharmaceutically acceptable excipients.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a therapeutically effective amount of compound I-A; and at least one compound selected from group consisting of compound II, compound III, compound IV and compound V; and pharmaceutically acceptable salts, solvates thereof.

BRIEF DESCRIPTION OF FIGURES

FIG. 1. AUC of % pain score at 0 hour post cyclophosphamide (CYP) injection

FIG. 2. AUC of % pain score at 4 hour post cyclophosphamide (CYP) injection

DETAILED DESCRIPTION OF THE INVENTION

The detailed description and the examples provided herein are exemplary and any modification or variation within the scope of the invention will be apparent to a person skilled in the art. Further, unless otherwise defined, all the technical and scientific terms used herein shall bear the meaning as understood by a person who is ordinarily skilled in the art.

As used herein, the term "pharmaceutical composition" for the purpose of the invention, means a composition in the form of pharmaceutical preparation wherein said compositions can be administered via route selected from group consisting of oral, parenteral, nasal, topical, rectal, buccal, ophthalmic, vaginal, otic or an implanted reservoir.

As used herein, the term "pharmaceutically acceptable" means salt, carriers, excipients, and other composition ingredients that are compatible with all other pharmaceutical ingredients of a composition and are not deleterious to an individual treated with composition.

As used herein, the term "solvate" is physical form of the compound I or a pharmaceutically acceptable salt thereof and either a stoichiometric or a non-stoichiometric amount of a solvent.

As used herein, the term "salt" refers to an acid or base salt of a compound of the invention. Salts of basic compounds are salts formed with mineral acids, organic carboxylic acids, organic sulfonic acids, and the like. Examples of suitable acids include hydrochloric, hydrobromic, sulfuric, nitric, perchloric, fumaric, maleic, phosphoric, glycolic, lactic, salicylic, succinic, toluene-p-Sulfonic, tartaric, acetic, citric, methanesulfonic, formic, benzoic, malonic, naphthalene-2-sulfonic, trifluoracetic acid and benzenesulfonic acids. Salts of acidic compounds are formed with bases, namely cationic species such as alkali and alkaline earth metal cations e.g., sodium, lithium, potassium, calcium, and magnesium ions, as well as ammonium cations e.g., ammonium, trimethylammonium and diethylammonium.

According to a first aspect, the present invention provides compound useful for the treating condition or symptoms associated with bradykinin receptor antagonism.

In another aspect, the present invention provides a pharmaceutical composition comprising a compound useful for treating the condition or symptoms associated with bradykinin receptor antagonism and pharmaceutically acceptable excipients. In another aspect, the pharmaceutical compositions of this invention may be administered via oral, parenteral, nasal, topical, rectal, buccal, ophthalmic, vaginal, otic route or via an implanted reservoir. Preferably, the pharmaceutical compositions of this invention may be administered orally or by injection. The pharmaceutical compositions disclosed herein may also further comprise carriers, binders, diluents, and excipients.

For instance, in some embodiments the pharmaceutical compositions are in a form of solid product for oral delivery, said product form being selected from a group comprising of a tablet, lozenge, pastilles, concentrate, dried powder, capsule, pellet, pill, effervescent powder or tablet, chewable tablet, tablet or mini tablet in capsule, dispersible tablets, mouth dissolving dosage form, sublingual tablets and buccal tablets.

In further instance, in some embodiments the pharmaceutical composition comprising product for oral delivery may include immediate release composition of the claimed compound. Immediate release composition includes tablets, capsules, minitablets in capsules, powder filled in sachet, effervescent tablets, fast disintegrating tablet, mouth dissolving tablet, chewable tablet, dispersible tablet. In further instance, in some embodiments the pharmaceutical composition comprising product for oral delivery may include modified release composition of the claimed compounds. In further instance, the modified release composition includes controlled release, extended release, sustained release, delayed release, pulsatile release, combination of immediate and extended release etc.

For instance, in some embodiments the pharmaceutical compositions are in a form of a product for oral liquids, said product form being selected from a group comprising of a suspension, solution, emulsion, syrup, oral drops, powdered granules for solution or suspension.

For instance, in some embodiments the pharmaceutical compositions are in a form of a product for parenteral, said product form being selected from a group comprising of a intravenous injection, intramuscular injection, subcutaneous injection, powder for solution for injection, powder for suspension for injection, liposome, oily injection, sustained release particles, nanoparticle, microsphere, emulsion.

For instance, in some embodiments the pharmaceutical compositions are in a form of a product for nasal, said product form being selected from a group comprising of a nasal drops, nasal sprays, metered dose inhaler (MDI), dry powdered inhaler (DPI), multiple dose powdered inhaler.

For instance, in some embodiments the pharmaceutical compositions are in a form of a product for topical, said product form being selected from a group comprising of ointments, cream, gel, lotion, paste, foam.

For instance, in some embodiments the pharmaceutical compositions are in a form of a product for rectal, said product form being selected from a group comprising of a suppository, enema, rinsing solution.

For instance, in some embodiments the pharmaceutical compositions are in a form of a product for ophthalmic, said product form being selected from a group comprising of a eye drop, suspension, emulsion, gel.

For instance, in some embodiments the pharmaceutical compositions are in a form of a product for vaginal, said product form being selected from a group comprising of a pessary, suppositories, gel, tablet.

For instance, in some embodiments the pharmaceutical compositions are in form of a product for otic, said product form being selected as ear drops.

In an aspect of the aspect of the present invention the pharmaceutical excipients can be selected from the group comprising of fillers or diluents, binder or adhesive, disintegrants, lubricant, preservative, plasticizer, colouring agent, opacifier, chelating agents, glidant, flavouring agent, sweetening agent, antiadherent, coating agent, wetting agent, adsorbents, buffers, controlled-release agent, surfactants, solvent or vehicle, antioxidants, emulsifying agent, chelating agent, suspending agent or other excipients like thereof.

In one of the aspect of the present invention, the pharmaceutical excipient can be selected from fillers or diluents. The fillers or diluents can be selected from the group comprising of ammonium alginate, calcium carbonate, calcium lactate, calcium phosphate dibasic anhydrous, calcium phosphate dibasic dihydrate, calcium phosphate tribasic, calcium silicate, calcium sulfate, cellulose microcrystalline, cellulose powdered, cellulose silicified microcrystalline, cellulose acetate, corn starch and pregelatinized starch, dextrates, dextrin, dextrose, erythritol, ethylcellulose, fructose, fumaric acid, glyceryl palmitostearate, isomalt, kaolin, lactitol, lactose anhydrous, lactose monohydrate, lactose monohydrate and corn starch, lactose monohydrate and povidone, lactose monohydrate and lactose spray-dried, lactose monohydrate and microcrystalline cellulose, magnesium carbonate, magnesium oxide, maltitol, maltodextrin, maltose, mannitol, polydextrose, polymethacrylates, simethicone, sodium alginate, sodium chloride, sorbitol, starch, starch pregelatinized, starch sterilizable maize, sucrose, sugar compressible, sugar confectioner's, sugar spheres, sulfobutylether b-cyclodextrin, sunflower oil, talc, tragacanth, trehalose, xylitol or mixture thereof.

In one of the aspects of the present invention, the pharmaceutical excipient can be selected from the binder or adhesive. The Binder or adhesive can be selected from the group comprising of acacia, agar, alginic acid, calcium carbonate, calcium phosphate tribasic, calcium lactate, carbomer, carboxymethylcellulose sodium, carrageenan, cellulose acetate phthalate, *Ceratonia*, cellulose microcrystalline, chitosan, copovidone, cottonseed oil, dextrates, dextrin, dextrose, ethylcellulose, gelatin, liquid glucose, glyceryl behenate, guar gum, hydroxyethyl cellulose, hydroxyethylmethyl cellulose, hydroxypropyl cellulose, hydroxypropyl starch, lactose anhydrous, spray-dried lactose, low-substituted hydroxypropyl cellulose, hypromellose, inulin, monohydrate lactose, magnesium aluminum silicate, maltodextrin, maltose, methylcellulose, pectin, poloxamer, polycarbophil, polydextrose, polyethylene oxide, polymethacrylates, povidone, sodium alginate, starch pregelatinized, starch, sucrose, sunflower oil, hydrogenated vegetable oil, vitamin e polyethylene glycol succinate, zein, tragacanth, isopropyl alcohol polyethylene glycol, polyvinylpyrrolidone, stearic acid, tricaprylin, zein or mixture thereof.

In one of the aspect of the present invention, the pharmaceutical excipient can be selected from disintegrant. The disintegrant can be selected from the group comprising of alginic acid, calcium alginate, carboxymethylcellulose calcium, carboxymethylcellulose sodium, cellulose, cellulose microcrystalline, cellulose powdered, chitosan, colloidal silicon dioxide, corn starch and pregelatinized starch, croscarmellose sodium, crospovidone, docusate sodium, glycine, guar gum, hydroxypropyl cellulose low-substituted, hydroxypropyl starch, lactose, monohydrate and corn starch (maize), dried starch, magnesium aluminum silicate, methylcellulose, polacrilin potassium, povidone, sodium alginate, sodium starch glycolate, starch, starch pregelatinized or mixture thereof.

In one of the aspects of the present invention, the pharmaceutical excipient can be selected from lubricant. The lubricant can be selected from the group comprising of calcium stearate, canola oil, castor oil, hydrogenated, glyceryl behenate, glyceryl monostearate, glyceryl palmitostearate, lauric acid, leucine, magnesium stearate, light mineral oil, mineral oil, magnesium lauryl sulfate, myristic acid, octyldodecanol, palmitic acid, poloxamer, polyethylene glycol, polyvinyl alcohol, potassium benzoate, sodium benzoate, sodium hyaluronate, sodium lauryl sulfate, spray-dried lactose, sodium stearyl fumarate, starch sterilizable maize, stearic acid, talc, tricaprylin, vegetable oil hydrogenated, zinc stearate, sodium chloride or mixture thereof.

In one of the aspects of the present invention, the pharmaceutical excipient can be selected from the preservative. The preservative can be selected from the group comprising of alcohol, benzalkonium chloride, benzethonium chloride, benzoic acid, benzyl alcohol, boric acid, bronopol, butylene glycol, butylated hydroxyanisole, butylparaben, calcium acetate, calcium chloride, calcium lactate, cetrimide, cetylpyridinium chloride, chlorhexidine, chlorobutanol, chlorocresol, chloroxylenol, citric acid monohydrate, cresol, dimethyl ether, ethylparaben, glycerin, hexetidine, imidurea, isopropyl alcohol, lactic acid, methylparaben, monothioglycerol, pentetic acid, phenol, phenoxyethanol, phenylethyl alcohol, phenylmercuric acetate, phenylmercuric borate, phenylmercuric nitrate, potassium benzoate, potassium metabisulfite, potassium sorbate, propionic acid, propylene glycol, propyl gallate, propylparaben, propylparaben sodium, sodium acetate, sodium benzoate, sodium borate, sodium lactate, sodium metabisulfite, sodium propionate, sodium sulfite, sorbic acid, sulfur dioxide, thimerosal, sulfobutyletherb-cyclodextrin, xylitol, edetic acid or mixture thereof.

In one of the aspects of the present invention, the pharmaceutical excipient can be plasticizer. The Plasticizer can be selected from the group comprising of acetyltributyl citrate, acetyltriethyl citrate, benzyl benzoate, chlorobutanol, cellulose acetate phthalate compatible, dextrin, dibutyl phthalate, dibutyl sebacate, diethyl phthalate, dimethyl phthalate, glycerin, glycerin monostearate, hypromellose phthalate compatible, mannitol, mineral oil and lanolin alcohols, petrolatum and lanolin alcohols, polyethylene glycol, propylene glycol, pyrrolidone, sorbitol, triacetin, tributyl citrate, triethyl citrate, palmitic acid, polymethacrylate compatible, polyvinyl acetate phthalate, stearic acid, triethanolamine or mixture thereof.

In one of the aspects of the present invention, the pharmaceutical excipient can be colouring agent. The Coloring Agent can be selected from the group comprising of red 3 (erythrosine), red 40 (allura red ac), yellow 5 (tartrazine), yellow 6 (sunset yellow), blue 1 (brilliant blue), blue 2 (indigotine), green 3 (fast green), iron oxides or mixture thereof.

In one of the aspects of the present invention, the pharmaceutical excipient can be opacifier. The Opacifier can be selected from the group comprising of aluminum monostearate, calcium carbonate, calcium silicate, ceresin, titanium dioxide, zinc acetate, coloring agents, ethylene glycol palmitostearate, octyldodecanol, zinc stearate or mixture thereof.

In one of the aspects of the present invention, the pharmaceutical excipient can be Chelating agents. The chelating agent can be selected from the group comprising of calcium acetate, hydroxypropyl betadex, potassium citrate, citric acid, citric acid monohydrate, disodium edetate, edetic acid, malic acid, pentetic acid, phosphoric acid, sodium citrate dihydrate, dibasic sodium phosphate, monobasic sodium phosphate, tartaric acid, potassium citrate, fumaric acid, maltol, pentetic acid or mixture thereof.

In one of the aspects of the present invention, the pharmaceutical excipient can glidant. The glidant can be selected from the group comprising of tribasic calcium phosphate, powdered cellulose, colloidal silicon dioxide, hydrophobic colloidal silica, magnesium oxide, magnesium trisilicate, magnesium silicate, silicon dioxide, talc or mixture thereof.

In one of the aspects of the present invention, the pharmaceutical excipient can be flavoring agent. The flavouring agent can be selected from the group comprising of adipic acid, n-butyl lactate, confectioner's sugar, citric acid monohydrate, dibutyl sebacate, denatonium benzoate, ethyl acetate, ethyl lactate, ethyl maltol, ethyl vanillin, ethylcellulose, fructose, fumaric acid, leucine, malic acid, maltol, menthol, methionine, monosodium glutamate, neohesperidin dihydrochalcone, neotame, sodium acetate, sodium lactate, triethyl citrate, tartaric acid, thaumatin, thymol, trehalose, vanilla, phosphoric acid, propionic acid, sodium propionate or mixture thereof.

The Sweetening agent can be selected from the group comprising of acesulfame potassium, alitame, aspartame, dextrose, erythritol, fructose, glucose liquid, glycerin, inulin, isomalt, lactitol, maltitol, maltitol solution, maltose, mannitol, neohesperidin dihydrochalcone, neotame, saccharin, saccharin sodium, sodium cyclamate, sorbitol, sucralose, sucrose, compressible sugar, confectioner's sugar, tagatose, thaumatin, trehalose, xylitol or mixture thereof.

The Antiadherent can be selected from the group comprising of magnesium stearate, calcium stearate, leucine, colloidal silicon dioxide, talc, starch, cellulose microcrystalline, leucine or mixture thereof In one of the aspects of the present invention, the pharmaceutical excipient can be coating agent. The Coating agent can be selected from the group comprising of acetyltriethyl citrate, ammonium alginate, calcium carbonate, carboxymethylcellulose calcium, carboxymethylcellulose sodium, carnauba wax, cellulose acetate, cellulose acetate phthalate, ceresin, cetyl alcohol, chitosan, copovidone, dibutyl phthalate, diethyl phthalate, dimethyl phthalate, ethylcellulose, ethyl lactate, fructose, gelatin, liquid glucose, glycerin, glyceryl behenate, glyceryl palmitostearate, hydroxyethyl cellulose, hydroxyethylmethyl cellulose, hydroxypropyl cellulose, hypromellose, hypromellose acetate succinate, hypromellose phthalate, isomalt, latex particles, maltitol, maltodextrin, methylcellulose, microcrystalline wax, polydextrose, poly(methyl vinyl ether/maleic anhydride), poly(dl-lactic acid), polyethylene oxide, polyvinyl acetate phthalate, polyvinyl alcohol, polymethacrylates, shellac, sucrose, confectioner's sugar, titanium dioxide, carnauba wax, microcrystalline wax, xylitol, zein or mixture thereof.

In one of the aspects of the present invention, the pharmaceutical excipient can be wetting agent. The Wetting agent can be selected from the group comprising of benzalkonium chloride, benzethonium chloride, cetylpyridinium chloride, docusate sodium, glycine, glycofurol, hypromellose, poloxamer, phospholipids, polyoxyethylene alkyl ethers, polyoxyethylene castor oil derivatives, polyoxyethylene sorbitan fatty acid esters, polyoxyethylene stearates, polyoxyl 40 stearate, sodium lauryl sulfate, sorbitan esters (sorbitan fatty acid esters), tricaprylin or mixture thereof.

In one of the aspects of the present invention, the pharmaceutical excipient can be adsorbent. The Adsorbents can be selected from the group comprising of aluminum hydroxide adjuvant, anhydrous calcium phosphate, aluminum oxide, aluminum phosphate adjuvant, attapulgite, bentonite, starch, colloidal silicon dioxide, magnesium carbonate, bentonite, kaolin, calcium silicate, hectorite, magnesium aluminum silicate, magnesium carbonate, pectin, polycarbophil, saponite, magnesium silicate, magnesium oxide, cellulose microcrystalline, powdered cellulose and colloidal silicon dioxide, kaolin, talc or mixture thereof.

In one of the aspects of the present invention, the pharmaceutical excipient can be buffer. The buffer can be selected from the group comprising of acetic acid, adipic acid, ammonia solution, boric acid, calcium carbonate, calcium hydroxide, calcium lactate, calcium phosphate (tribasic), citric acid monohydrate, dibasic sodium phosphate, diethanolamine, glycine, maleic acid, malic acid, methionine, monosodium glutamate, monoethanolamine, monosodium glutamate, potassium citrate, sodium acetate, sodium borate, sodium carbonate, sodium citrate dihydrate, sodium hydroxide, sodium lactate, sodium phosphate (dibasic), sodium phosphate (monobasic), propionic acid, phosphoric acid, sodium bicarbonate, triethanolamine or mixture thereof.

In one of the aspects of the present invention, the pharmaceutical excipient can be controlled release agents. The controlled-release agent can be selected from the group comprising of agar, alginic acid, carbomer, carrageenan, cellulose acetate, cellulose acetate phthalate with ethyl cellulose, chitosan, glyceryl monooleate, glyceryl monostearate, glyceryl palmitostearate, guar gum, hydrogenated castor oil, hypromellose, hypromellose acetate succinate, oleyl alcohol, polyoxylglycerides, ethylcellulose, sodium hyaluronate, sodium alginate, xanthan gum, *Ceratonia*, polycarbophil, poly(dl-lactic acid), microcrystalline wax, white wax, yellow wax, hydroxypropyl cellulose, ethylcellulose, methylcellulose, starch or mixture thereof.

In one of the aspects of the present invention, the pharmaceutical excipient can be surfactants. The surfactants can be selected from the group comprising of polysorbates, polysorbate 80, cetrimide, cetylpyridinium chloride, docusate sodium, glyceryl monooleate, lauric acid, macrogol 15 hydroxystearate, myristyl alcohol, phospholipids, polyoxyethylene sorbitan fatty acid esters, polyoxylglycerides, sodium lauryl sulfate, sorbitan esters (sorbitan fatty acid esters), vitamin e polyethylene glycol succinate cetrimide, cetylpyridinium chloride, docusate sodium, glyceryl monooleate, lauric acid, macrogol 15 hydroxystearate, myristyl alcohol, phospholipids, polyoxyethylene sorbitan fatty acid esters, polyoxylglycerides, sodium lauryl sulfate, sorbitan esters (sorbitan fatty acid esters), polyoxyl 35 castor oil, vitamin e polyethylene glycol succinate or mixture thereof.

In one of the aspects of the present invention, the pharmaceutical excipient can be solvent or vehicle. The solvent or vehicle can be selected from the group comprising of acetone, alcohol, almond oil, benzyl benzoate, butylene glycol, castor oil, canola oil, corn oil, cottonseed oil, dibutyl phthalate, diethyl phthalate, dimethyl phthalate, dimethyl sulfoxide, dimethylacetamide, ethyl acetate, ethyl lactate, ethyl oleate, ethanol, glycofurol, isopropyl alcohol, isopropyl myristate, isopropyl palmitate, medium-chain triglycerides, mineral oil, mineral oil (light), peanut oil, polyethylene glycol, propylene carbonate, propylene glycol, pyrrolidone, safflower oil, sesame oil, soybean oil, sunflower oil, triacetin, tricaprylin, triethyl citrate, triolein, water for injection, myristyl alcohol, olive oil, peanut oil, glycerin, water for injection, sterile water for injection, bacteriostatic water for injection or mixture thereof.

In one of the aspects of the present invention, the pharmaceutical excipient can be antioxidant. The Antioxidant can be selected from the group comprising of alpha tocopherol, ascorbic acid, ascorbyl palmitate, butylated hydroxyanisole, butylated hydroxytoluene, citric acid, citraconic acid, ethylenediaminetetraacetic acid salts, fumaric acid, malic acid, methionine, propionic acid, propyl gallate, phosphoric acid, sodium ascorbate, sodium formaldehyde sulfoxylate, sodium metabisulfite, sodium sulfite, sodium bisulfite, sodium thiosulfate, tartaric acid, thiourea, tocopherols, sodium formaldehyde sulfoxide, thymol, vitamin e polyethylene glycol succinate or mixture thereof.

In one of the aspects of the present invention, the pharmaceutical excipient can be emulsifying agent. The Emulsifying agent can be selected from the group comprising of acacia, agar, ammonium alginate, calcium alginate, carbomer, carboxymethylcellulose calcium, carrageenan, cetostearyl alcohol, cholesterol, ethylene glycol stearates, glyceryl monooleate, glyceryl monostearate, hectorite, hydroxypropyl cellulose, hydroxypropyl starch, hypromellose, lanolin, lanolin (hydrous), lanolin alcohols, lauric acid, lecithin, linoleic acid, medium-chain triglycerides, methylcellulose, mineral oil and lanolin alcohols, monoethanolamine, myristic acid, oleic acid, octyldodecanol, oleyl alcohol, palmitic acid, pectin, phospholipids, poloxamer, polycarbophil, polyoxyethylene alkyl ethers, polyoxyethylene castor oil derivatives, polyoxyethylene sorbitan fatty acid esters, polyoxyethylene stearates, polyoxylglycerides, potassium alginate, propylene glycol alginate, saponite, sodium citrate dihydrate, sodium lactate, sodium phosphate (monobasic), sorbitan esters (sorbitan fatty acid esters), stearic acid, sunflower oil, triethanolamine, vitamin e polyethylene glycol succinate, wax (anionic emulsifying) or mixture thereof.

In one of the aspects of the present invention, the pharmaceutical excipient can be chelating agent. The Chelating agent can be selected from the group comprising of citric acid monohydrate, disodium edetate, edetate calcium disodium, edetate tetrasodium, edetic acid, malic acid, pentetic acid or mixture thereof.

In one of the aspects of the present invention, the pharmaceutical excipient can be suspending agent. The Suspending Agents can be selected from the group comprising of acacia, agar, alginic acid, bentonite, carbomer, calcium stearate, carboxymethylcellulose calcium, carboxymethylcellulose sodium, carrageenan, microcrystalline cellulose, carboxymethylcellulose sodium, cellulose powdered, *Ceratonia*, colloidal silicon dioxide, dextrin, gelatin, guar gum, hydrophobic colloidal silica, hydroxyethyl cellulose, hydroxyethylmethyl cellulose, hydroxypropyl cellulose, hypromellose, kaolin, magnesium aluminum silicate, maltitol solution, medium-chain triglycerides, methylcellulose, phospholipids, polycarbophil, polyoxyethylene sorbitan fatty acid esters, potassium alginate, povidone, propylene glycol alginate, sodium alginate, saponite, sesame oil, sorbitan esters (sorbitan fatty acid esters), sucrose, tragacanth, vitamin e polyethylene glycol succinate, xanthan gum, *Ceratonia*, hectorite or mixture thereof.

In one of the aspects of the present invention, the pharmaceutical excipient can be gelling agent. The Gelling agents can be selected from the group comprising of aluminum monostearate, gelatin, glyceryl monooleate, glyceryl palmitostearate, pectin, zinc acetate, carbomer934, carboxy methyl cellulose, hydroxy propyl cellulose, xanthan gum or mixture thereof.

In one of the aspect of the present invention, the pharmaceutical excipient can be emollient. The Emollients can be selected from the group comprising of almond oil, aluminum monostearate, canola oil, castor oil, cetostearyl alcohol, cholesterol, coconut oil, cyclomethicone, dimethicone, ethylene glycol stearates, glycerin, glyceryl monooleate, glyceryl monostearate, isopropyl myristate, isopropyl palmitate, lecithin, mineral oil, mineral oil, light, mineral oil and lanolin alcohols, myristyl alcohol, octyldodecanol, oleyl alcohol, petrolatum, petrolatum and lanolin alcohols, safflower oil, sunflower oil, tricaprylin, triolein, wax cetyl esters, xylitol, zinc acetate or mixture thereof.

In one of the aspects of the present invention, the pharmaceutical excipient can be humectant. The Humectant can be selected from the group comprising of ammonium alginate, butylene glycol, cyclomethicone, glycerin, polydextrose, propylene glycol, sodium hyaluronate, sodium lactate, sorbitol, triacetin, trehalose, xylitol or mixture thereof.

In another aspect, the present invention provides a method for the prevention or treatment of a bradykinin receptor mediated urinary bladder pain. The method comprises administering a therapeutically effective amount of compound I.

In another aspect, the present invention also provides the use of compound I for the preparation of a medicament for the prevention or treatment of a bradykinin mediated disease or condition.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters. The method comprises administering a therapeutically effective amount of compound I.

According to a first aspect, the present invention provides compounds useful for the treating condition or symptoms associated with bradykinin receptor antagonism. In one aspect, the present invention provides a pharmaceutical composition comprising compound I; pharmaceutically acceptable salts, solvates thereof and pharmaceutically acceptable excipients;

Compound I

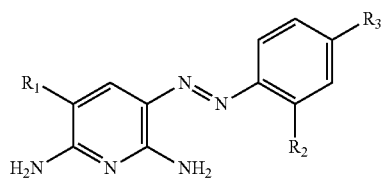

wherein $R_1$, $R_2$ and $R_3$ can be selected independently from hydrogen and hydroxyl group; with proviso that when $R_1$, $R_2$ and $R_3$ are hydrogen; the said composition does not include oral composition.

In another aspect, the present invention provides a method for the prevention or treatment of a bradykinin receptor mediated urinary bladder pain comprising administration of bradykinin receptor antagonist; where in the method comprises administering a therapeutically effective amount of compound I; pharmaceutically acceptable salts, solvates thereof; wherein $R_1$, $R_2$ and $R_3$ can be selected independently from hydrogen and hydroxyl group; with proviso that when $R_1$, $R_2$ and $R_3$ are hydrogen; the said method of administration of the compound does not include oral composition.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a therapeutically effective amount of compound I; pharmaceutically acceptable salts, solvates thereof; wherein $R_1$, $R_2$ and $R_3$ can be selected independently from hydrogen and hydroxyl group; with proviso that when $R_1$, $R_2$ and $R_3$ are hydrogen; the administration of the said compound does not include oral composition.

In another aspect, the present invention provides a pharmaceutical composition comprising compound I:

Compound I

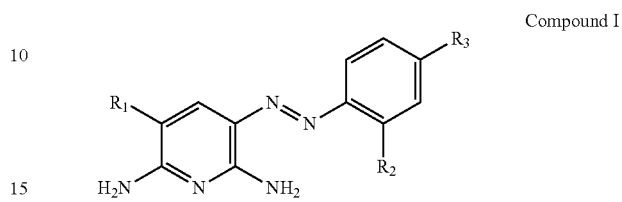

pharmaceutically acceptable salts, solvates thereof; and a pharmaceutically acceptable excipient; wherein $R_1$, $R_2$ and $R_3$ can be selected independently from hydrogen and hydroxyl group; with proviso that at least one of the substituent is always hydroxyl.

In another aspect, the present invention provides a pharmaceutical composition comprising at least one compound selected from:

Compound II

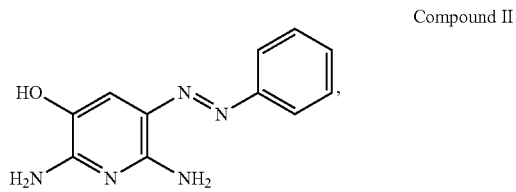

Compound III

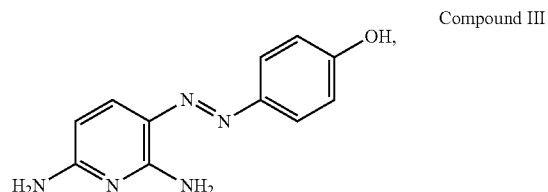

Compound IV

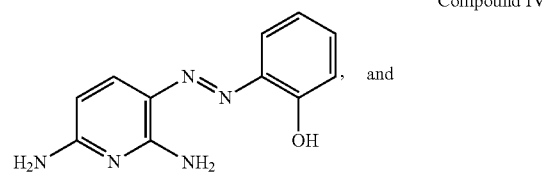

Compound V

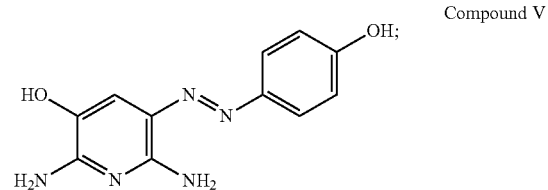

pharmaceutically acceptable salts, solvates thereof and a pharmaceutically acceptable excipients.

In another aspect, the present invention provides a pharmaceutical composition comprising at least two compounds selected from group consisting of compound II, compound III, compound IV and compound V; pharmaceutically acceptable salts, solvates thereof and pharmaceutically acceptable excipients.

In another aspect, the present invention provides a pharmaceutical composition comprising at least three compounds selected from group consisting of compound II, compound III, compound IV and compound V; pharmaceutically acceptable salts, solvates thereof; and pharmaceutically acceptable excipients.

In another aspect, the present invention provides a pharmaceutical composition comprising compound II, compound III, compound IV and compound V; pharmaceutically acceptable salts, solvates thereof and, pharmaceutically acceptable excipients.

In another aspect, the present invention provides a pharmaceutical composition comprising a combination of at least two compounds selected from group consisting of compound I-A, compound II, compound III, compound IV and compound V, useful for the treating condition or symptoms associated with bradykinin receptor antagonism and pharmaceutically acceptable excipients.

In another aspect, the present invention provides a pharmaceutically acceptable salts of compounds selected from group consisting of compound II, compound III, compound IV and compound V. In another aspect, the pharmaceutically acceptable salts can be selected from salts formed with mineral acids. In one of the aspect, the suitable acids include hydrochloric, hydrobromic, sulfuric, nitric, perchloric, fumaric, maleic, phosphoric, glycolic, lactic, salicylic, succinic, toluene-p-Sulfonic, tartaric, acetic, citric, methanesulfonic, formic, benzoic, malonic, naphthalene-2-sulfonic, trifluoroacetic acid, benzenesulfonic acids and the like.

In another aspect, the present invention provides a pharmaceutical composition comprising combination of compound I-A

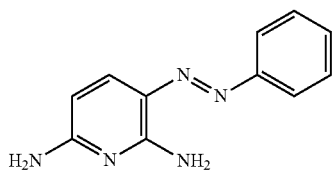

Compound I-A and at least one compound selected from group consisting of compound II, compound III, compound IV and compound V; pharmaceutically acceptable salts, solvates thereof and pharmaceutically acceptable excipients.

In another aspect, the present invention provides a method for treatment of a bradykinin receptor mediated Interstitial cystitis or painful bladder syndrome (IC/PBS) with or without Hunner's lesion.

In another aspect, the present invention provides a method for treatment of a bradykinin receptor mediated urologic chronic pelvic pain syndrome (UCPPS). This further encompasses interstitial cystitis, bladder pain syndrome, chronic prostatitis, chronic pelvic pain syndrome. It is characterized by chronic pain in the pelvic region or genitalia that is often accompanied by urinary frequency and urgency.

In another aspect, the present invention provides a method for symptomatic treatment of urinary Tract Infection (UTI) induced pelvic pain mediated by bradykinin receptor.

In another aspect, the present invention provides a method for symptomatic treatment of cancer pain syndromes of the genitourinary region mediated by bradykinin receptor.

In another aspect, the present invention provides a method for symptomatic treatment of urogenital pain syndromes mediated by bradykinin receptor. This encompasses a wide variety of disorders including chronic prostatitis, vulvodynia, pelvic floor dysfunction, urethral syndrome.

In another aspect, the present invention provides a method for the prevention or treatment of a bradykinin receptor mediated urinary bladder pain comprising administration of bradykinin receptor antagonist; where in the method comprises administering a therapeutically effective amount of compound I-A

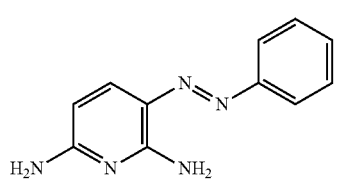

Compound I-A and at least one compound selected from group consisting of compound II, compound III, compound IV and compound V; and pharmaceutically acceptable salts, solvates thereof.

In another aspect, the present invention provides a method for the prevention or treatment of a bradykinin receptor mediated urinary bladder pain comprising administration of bradykinin receptor antagonist; where in the method comprises administering a pharmaceutical composition comprising compound I-A

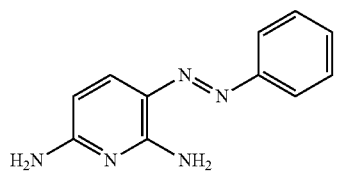

Compound I-A and at least one compound selected from group consisting of compound II, compound III, compound IV and compound V; pharmaceutically acceptable salts, solvates thereof and pharmaceutically acceptable excipients.

In another aspect, the present invention provides a method for the treatment of urinary bladder pain comprising administration of therapeutically effective amount of a compound I-A; and at least one compound selected from group consisting of compound II, compound III, compound IV and compound V; and pharmaceutically acceptable salts, solvates thereof.

In another aspect, the present invention provides a method for the treatment of urinary bladder pain comprising administration of a pharmaceutical composition comprising compound I-A; and at least one compound selected from group consisting of compound II, compound III, compound IV and compound V; pharmaceutically acceptable salts, solvates thereof and pharmaceutically acceptable excipients.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a therapeutically effective amount of compound I-A:

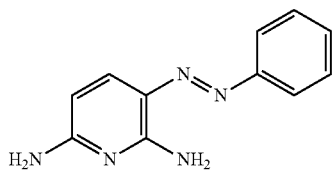

Compound I-A and at least one compound selected from group consisting of compound II, compound III, compound IV and compound V; and pharmaceutically acceptable salts, solvates thereof.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a pharmaceutical composition comprising compound I-A:

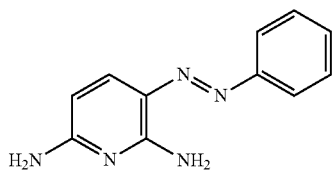

Compound I-A and at least one compound selected from group consisting of compound II, compound III, compound IV and compound V; and pharmaceutically acceptable salts, solvates thereof and pharmaceutically acceptable excipients.

In one aspect, the present invention provides a pharmaceutical composition comprising a compound I capable of inhibiting bradykinin receptor in a therapeutically effective amount;

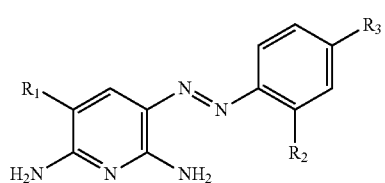

Compound I pharmaceutically acceptable salts, solvates thereof and pharmaceutically acceptable excipients; wherein $R_1$, $R_2$ and $R_3$ can be selected independently from hydrogen and hydroxyl group.

In another aspect, the present invention provides a method for the prevention or treatment of urinary bladder pain comprising administration of therapeutically effective amount of compound I; pharmaceutically acceptable salts, solvates thereof; wherein $R_1$, $R_2$ and $R_3$ can be selected independently from hydrogen and hydroxyl group; and with proviso that when $R_1$, $R_2$ and $R_3$ are hydrogen; the administration of the said compound does not include oral composition.

In another aspect, the present invention provides a method for the prevention or treatment of urinary bladder pain comprising administration of therapeutically effective amount of compound I; pharmaceutically acceptable salts, solvates thereof; wherein $R_1$, $R_2$ and $R_3$ can be selected independently from hydrogen and hydroxyl group; and with proviso that at least one of the substituent is always hydroxyl.

In another aspect, the present invention provides a method for the prevention or treatment of urinary bladder pain comprising administration of therapeutically effective amount of at least once compound selected from group consisting of compound II, compound III, compound IV and compound V; and pharmaceutically acceptable salts, solvates thereof.

In another aspect, the present invention provides a method for the prevention or treatment of urinary bladder pain comprising administration of a pharmaceutical composition comprising at least one compound selected from group consisting of compound II, compound III, compound IV and compound V; pharmaceutically acceptable salts, solvates thereof and pharmaceutically acceptable excipients.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering therapeutically effective amount of compound I; pharmaceutically acceptable salts, solvates thereof; wherein $R_1$, $R_2$ and $R_3$ can be selected independently from hydrogen and hydroxyl group; and with proviso that when $R_1$, $R_2$ and $R_3$ are hydrogen; the administration of the said compound does not include oral composition.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering therapeutically effective amount of compound I; pharmaceutically acceptable salts, solvates thereof; wherein $R_1$, $R_2$ and $R_3$ can be selected independently from hydrogen and hydroxyl group; with proviso that at least one of the substituent is always hydroxyl.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a therapeutically effective amount of at least one compound selected from group consisting of compound II, compound III, compound IV and compound V; and pharmaceutically acceptable salts, solvates thereof.

In another aspect, the present invention provides a method for the symptomatic relief of pain, burning, urgency, frequency, and other discomforts arising from irritation of the lower urinary tract mucosa caused by infection, trauma, surgery, endoscopic procedures, or the passage of sounds or catheters comprises administering a pharmaceutical composition comprising at least one compound selected from group consisting of compound II, compound III, compound IV and compound V; and pharmaceutically acceptable salts, solvates thereof and pharmaceutically acceptable excipients.

In another aspect, the present invention provides process for preparing compound selected from group consisting of compound II, compound III, compound IV and compound V.

When used in medicine, the salts of compound I should be pharmaceutically acceptable, but pharmaceutically unacceptable salts may conveniently be used to prepare the corresponding free base or pharmaceutically acceptable salts thereof.

The following examples are given for the purpose of illustrating the present invention and should not be considered as limiting the scope of the invention.

Example 1: Preparation of (E)-4-((2,6-diaminopyridin-3-yl)diazenyl)phenol hydrochloride 2,6-diaminopyridine (2.0 g) was dissolved in concentrated hydrochloride (conc. HCl) (1.6 ml) at room temperature. A cold suspension of benzene diazonium chloride (prepared by diazotization of 4-aminophenol (2.0 g) using sodium nitrite (1.24 g) and conc. HCl (1.63 g) at 0-50° C. stirred 15 minutes) was added to the reaction mass was by maintaining 0-50° C. and stirred at 0-50° C. for 1 hour. The product was precipitated as it is formed. The reaction mass was stirred at room temperature for 4 hours. After completion of the reaction, the reaction mass was poured into water (10 ml) and stirred for 10 min. The solid product was filtered, washed with water and dried under vacuum at 40° C. to afford (E)-4-((2,6-diaminopyridin-3-yl)diazenyl)phenol hydrochloride (2.6 g, 53.49%) as dark brown solid.

$^1$H-NMR (400 MHz, DMSO): 6.135 (bs, 1H), 6.858-6.879 (d, 2H), 7.740-7.761 (d, 2H), 8.001-8.022 (d, 1H), 8.251 (bs, 2H), δ 10.035 (bs, 1H)

Example 2: Preparation of (E)-2,6-diamino-5-(phenyldiazenyl)pyridin-3-ol

Step-1: To a stirred solution of 2,6-dibromo-3-hydroxypyridine (1.0 g) in dimethyl sulfoxide (DMSO) (1.5 mL) were added $K_2CO_3$ (0.49 g) and Methyl iodide (1.96 g) at room temperature. Reaction mixture was stirred at 120° C. for 1.5 h. Five parallel reaction of same batch scale was performed. After completion of reaction, combined reaction mixture were cooled to room temperature; quenched in sodium thiosulfate ($Na_2S_2O_3$) solution (150 ml) extracted by ethyl acetate (EtOAc) (3×100 ml). Combined organic layers were washed with $Na_2S_2O_3$ solution (2×150 ml); dried over sodium sulfate ($Na_2SO_4$) and evaporated in vacuum to obtain crude. The crude was purified by flash chromatography and the product was eluted at 4% EtOAc in hexane to obtain 2,6-dibromo-3-methoxypyridine (3.6 g, 68.22%). The obtained material was used for next step without purification. LCMS: 94.46% (m/z: 267.9 [M+1]+).

Step-2: To a stirred solution of 2,6-dibromo-3-methoxypyridine (0.5 g) in tetrahydrofuran (THF) (5 mL) were added Cy johnphos (0.131 g) and $Pd_2(dba)_3$ (0.171 g) at room temperature. Argon gas purged in reaction mixture for 15 min. Reaction mixture was cooled to 0° C.; lithium bis(trimethylsilyl)amide (LiHMDS) (9.4 ml) was added dropwise to the reaction mixture at 0° C. The reaction mixture was stirred at 80° C. for 3 h. Two parallel reaction of same batch scale was performed. After completion of reaction, combined reaction mixture were cooled to room temperature; quenched in cold 1N HCl solution (100 ml) extracted by EtOAc (2×50 ml) to remove impurities. Aqueous layer basified with sodium carbonate ($Na_2CO_3$); extracted by EtOAc (8×50 ml) and combined organic layer dried over $Na_2SO_4$ and evaporated in vacuum to obtain crude. The crude was purified by flash chromatography and the product was eluted at 2% methanol (MeOH) in dichloromethane (DCM) to obtain 3-methoxypyridine-2,6-diamine (0.3 g, 57.54%). LCMS: 92.67% (m/z: 140.12 [M+1]+).

$^1$H-NMR (400 MHz, DMSO): δ 6.865 (d, 1H), 5.612 (d, 1H), 5.201 (s, 2H), 4.949 (s, 2H), 3.625 (s, 3H)

Step-3: To a stirred solution of aniline (0.418 g) in DM (demineralized) water (6 ml) and HCl (0.86 ml) was dropwise added solution of sodium nitrite ($NaNO_2$) (0.309 g) in demineralized (DM) water (1 ml) at 0° C. to 5° C. Reaction mixture was stirred at same temperature for 20 min. A solution of 3-methoxypyridine-2,6-diamine (0.26 g) in DM water (6 ml) and HCl (0.35 ml) was added to the reaction mixture at same temperature. Reaction mixture was stirred at room temperature for 1 h. After completion of reaction, reaction mixture was basified with sodium bicarbonate ($NaHCO_3$) solution (100 ml); extracted by EtOAc (3×50 ml). Combined organic layer dried over $Na_2SO_4$ and evaporated in vacuum to obtain crude. The crude was purified by flash chromatography and the product was eluted at 2.5% MeOH in DCM to obtain 3-methoxy-5-(phenyldiazenyl)pyridine-2,6-diamine (0.3 g, 68.22%). LCMS: 100% (m/z: 244.3 [M+1]+).

1H NMR (400 MHz, DMSO): δ 7.712 (d, 2H), 7.434 (t, 2H), 7.226 (t, 2H), 6.816 (s, 2H), 3.786 (s, 3H).

Step-4: To a stirred solution of 3-methoxy-5-(phenyldiazenyl)pyridine-2,6-diamine (0.27 g) in DCM (20 ml) was drop wise added boron tribromide ($BBr_3$) (9.4 ml). Reaction mixture was stirred at room temperature for 16 h. After completion of reaction, reaction mixture was basified with $NaHCO_3$ solution (100 ml); extracted by DCM (3×100 ml). Combined organic layer dried over $Na_2SO_4$ and evaporated in vacuum to obtain crude. The crude was purified by flash chromatography and the product was eluted at 6% to 8% MeOH in DCM. Further purified by preparative HPLC using mobile phase (A) 0.1% formic acid in water (B) 100% acetonitrile (MeCN). Product fraction was lyophilized to afford 2,6-diamino-5-(phenyldiazenyl)pyridin-3-ol (0.02 g, 7.86%) as a dark red solid. LCMS: 98.87% (m/z: 230.2 [M+1]+).

1H NMR (400 MHz, DMSO): δ 8.173 (s, 1H), 7.695 (d, 2H), 7.415 (t, 2H), 7.238 (t, 2H), 7.132 (s, 1H), 6.710 (s, 2H).

Example 3: Preparation of (E)-2,6-diamino-5-(phenyldiazenyl)pyridin-3-ol hydrochloride To a stirred solution of 3-methoxy-5-(phenyldiazenyl)pyridine-2,6-diamine (0.160 g) in DCM (20 mL) was added $BBr_3$ (6.5 mL) drop wise at 0° C. The reaction mixture was slowly warm to room temperature and stirred for 16 h. After completion of reaction, the reaction mixture was concentrated under nitrogen atmosphere to obtain crude compound. The crude was purified by Preparative HPLC [method: A) 0.1 HCl in water, B) 100% Acetonitrile). Product fractions were lyophilized to afford 2,6-diamino-5-(phenyldiazenyl)pyridin-3-ol hydrochloride (0.047 g, 31%) as red color solid. LCMS: 96.14% (m/z: 230.2 [M+1]+).

1H NMR (400 MHz, DMSO): δ 11.92 (s, 1H), 11.79 (s, 1H), 9.39 (s, 1H), 8.98 (s, 1H), 8.63 (d, 2H), 7.73 (d, 2H), 7.36 (q, 2H), 7.19 (d, 1H), 7.09 (t, 1H).

Example 4: Preparation of (E)-2,6-diamino-5-((4-hydroxyphenyl)diazenyl)pyridin-3-ol Step-1: To a stirred solution of 2,6-dibromo-3-hydroxypyridine (1.0 g) in DMSO (1.5 mL) were added $K_2CO_3$ (0.49 g) and Methyl iodide (1.96 g) at room temperature. Reaction mixture was stirred at 120° C. for 1.5 h. Five parallel reaction of same batch scale was performed. After completion of reaction, combined reaction mixture were cooled to room temperature; quenched in $Na_2S_2O_3$ solution (150 ml) extracted by EtOAc (3×100 ml). Combined organic layers were washed with $Na_2S_2O_3$ solution (2×150 ml); dried over $Na_2SO_4$ and evaporated in vacuum to obtain crude. The crude was purified by flash chromatography and the product was eluted at 4% EtOAc in hexane to obtained 2,6-dibromo-3-methoxypyridine (3.6 g, 68.22%). The obtained material was used for next step without purification. LCMS: 94.46% (m/z: 267.9 [M+1]+).

Step-2: To a stirred solution of 2,6-dibromo-3-methoxypyridine (0.5 g) in THF (5 mL) were added Cy johnphos (0.131 g) and $Pd_2(dba)_3$ (0.171 g) at room temperature. Argon gas purged in reaction mixture for 15 min. Reaction mixture was cooled to 0° C.; LiHMDS (9.4 ml) was added dropwise to the reaction mixture at 0° C. The reaction mixture was stirred at 80° C. for 3 h. Two parallel reaction of same batch scale was performed. After completion of reaction, combined reaction mixture were cooled to room temperature; quenched in cold 1N HCl solution (100 ml) extracted by EtOAc (2×50 ml) to remove impurities. Aqueous layer basified with $Na_2CO_3$; extracted by EtOAc (8×50 ml) and combined organic layer dried over $Na_2SO_4$ and evaporated in vacuum to obtain crude. The crude was purified by flash chromatography and the product was eluted at 2% MeOH in DCM to obtained 3-methoxypyridine-2,6-diamine (0.3 g, 57.54%). LCMS: 92.67% (m/z: 140.12 [M+1]+).

$^1$H-NMR (400 MHz, DMSO): δ 6.865 (d, 1H), 5.612 (d, 1H), 5.201 (s, 2H), 4.949 (s, 2H), 3.625 (s, 3H)

Step-3: To a stirred solution of 4-hydroxy aniline (0.480 g) in DM water (6 ml) and HCl (0.86 ml) was dropwise added solution of $NaNO_2$ (0.309 g) in DM water (1 ml) at 0° C. to 5° C. Reaction mixture was stirred at same temperature for 20 min. A solution of 3-methoxypyridine-2,6-diamine (0.26 g) in DM water (6 ml) and HCl (0.35 ml) was added to the reaction mixture at same temperature. Reaction mixture was stirred at room temperature for 1 h. After completion of reaction, reaction mixture was basified with $NaHCO_3$ solution (100 ml); extracted by EtOAc (3×100 ml). Combined organic layer dried over $Na_2SO_4$ and evaporated in vacuum to obtain crude. The crude was purified by combiflash column and the product was eluted at 3.0% MeOH in DCM to obtained 4-((2,6-diamino-5-methoxypyridin-3-yl)diazenyl)phenol (0.200 g, 81.32%). LCMS: 95.84% (m/z: 260.2 [M+1]+).

1H NMR (400 MHz, DMSO): δ 9.686 (s, 1H), 7.601 (d, 2H), 7.250 (s, 1H), 6.901 (d, 1H), 6.811 (d, 2H), 6.545 (d, 2H), 3.750 (s, 3H).

Step-4: To a stirred solution of 4-((2,6-diamino-5-methoxypyridin-3-yl)diazenyl)phenol (0.24 g) in DCM (20 ml) was drop wise added $BBr_3$ (9.2 ml). Reaction mixture was stirred at room temperature for 24 h. After completion of reaction, reaction mixture was basified with $NaHCO_3$ solution (100 ml); extracted by EtOAc (3×100 ml). Combined organic layer dried over $Na_2SO_4$ and evaporated in vacuum to obtain crude. The crude was purified by preparative HPLC using mobile phase (A) 0.1% Formic acid in water (B) 100% MeCN. Product fraction was lyophilized to afford 2,6-diamino-5-((4-hydroxyphenyl)diazenyl)pyridin-3-ol: (0.01 g, 4.40%). LCMS: 100% (m/z: 246.2 [M+1]+).

1H NMR (400 MHz, DMSO): δ 9.678 (s, 1H), 8.168 (s, 1H), 7.571 (d, 2H), 7.138 (s, 1H), 6.802 (d, 2H), 6.640 (s, 1H), 6.352 (d, 2H).

Example-5: Preparation of (E)-2,6-diamino-5-((4-hydroxyphenyl)diazenyl)pyridin-3-ol hydrochloride To a stirred solution of 4-((2,6-diamino-5-methoxypyridin-3-yl)diazenyl)phenol (0.100 g) in DCM (10 mL) was added $BBr_3$ (3.86 mL) drop wise at 0° C. The reaction mixture was stirred at room temperature for 16 h. After completion of reaction, the reaction mixture was concentrated under nitrogen atmosphere to obtain crude compound. The crude was purified by Prep HPLC [method: A) 0.1 HCl in water, B) 100% Acetonitrile)]. Product fractions were lyophilized to afford (E)-2,6-diamino-5-((4-hydroxyphenyl) diazenyl)pyridin-3-ol hydrochloride (0.018 g, 19%) as a red color solid. LCMS: 96.26% (m/z: 246 [M+1]+).

1H NMR (400 MHz, DMSO): 6.79 (d, J=8.8 Hz, 2H), 7.20 (d, 1H), 7.60 (s, 1H), 8.40 (d, 2H), 8.75 (s, 1H), 9.16 (s, 1H), 9.51 (s, 1H), 11.50 (s, 1H), δ 12.00 (s, 1H).

Example-6: Preparation of (E)-2-((2,6-diaminopyridin-3-yl)diazenyl)phenol Hydrochloride 2,6-diaminopyridine (2.0 g) was dissolved in Conc. HCl (1.6 ml) at room temperature. A cold suspension of benzene diazonium chloride (prepared by diazotization of 2-aminophenol (2.0 g) using sodium nitrite (1.24 g) and Conc. HCl (1.63 g) at 0-50° C. stirred 15 minutes) was added to the reaction mass was by maintaining 0-50° C. and stirred at 0-50° C. for 1 hour. The product was precipitated as it is formed. The reaction mass was stirred at room temperature for 4 hours. After completion of the reaction, the reaction mass was poured into water (10 ml) and stirred for 10 min. The solid product was filtered, washed with water and dried under vacuum at 40° C. to afford (E)-4-((2,6-diaminopyridin-3-yl)diazenyl)phenol hydrogen chloride (2.6 g, 53.49%) as dark brown solid.

Example 7: Preparation of (E)-2-((2,6-diaminopyridin-3-yl)diazenyl)phenol

To a stirred solution of 2,6-Diamino-3-[(2-hydroxyphenyl)azopyridone hydrochloride (0.500 g) in ammonia solution (10 mL) was stirred at room temperature for 1 h, followed by filtration to obtain (E)-2-((2,6-diaminopyridin-3-yl)diazenyl)phenol (0.41 g, 95%) as orange solid.

1H NMR (400 MHz, DMSO): 5.97 (d, J=8.8 Hz, 1H), 6.72 (br, 2H), 6.86-6.92 (m, 2H), 7.10-7.15 (m, 1H), 7.59-7.62 (m, 1H), 7.68 (d, J=8.8 Hz, 1H), 7.94 (br, 2H), 11.044 (s, 1H)

Example 8: Preparation of (E)-2,6-diamino-5-(phenyldiazenyl)pyridin-3-ol Trifluoroacetic Acid Salt Step-1: A pre-mixture solution of acetic anhydride (14.0 mL) and nitric acid (6.2 mL) was added drop wisely to a solution of 2-nitropyridin-3-ol (5.0 g) at 0° C. and resulting solution was stirred at 0° C. for 2 h followed by stirring at room temperature for 2 h. After completion of the reaction (monitored by TLC), the reaction mass was quenched with ice water and extracted with dichloromethane (3×150 mL). Collected organics were dried over anhydrous sodium sulfate, evaporated under reduced pressure to obtain crude. This crude was triturated with n-pentane followed by drying under reduced pressure to afford 2,6-dinitropyridin-3-ol (3.4 g, 51%) as yellow solid. The obtained material was used for next step without purification Step-2: To a stirred solution of 2,6-dinitropyridin-3-ol (10.0 g) in dimethylformamide (100 mL) was added potassium carbonate (18.6 g) and 4-methoxy benzyl chloride (10.9 g) at 0° C. and resulting mixture was stirred at 50° C. for 16 h. After completion of reaction (monitored by TLC), reaction mass was cooled to room temperature and then poured into ice water (300 mL). Reaction mass was extracted with ethyl acetate (3×150 mL), followed by washings with water (2×500 mL). Collected organics were dried over anhydrous sodium sulfate, evaporated under reduced pressure to obtain crude. The crude was purified by flash chromatography using 30% ethyl acetate in hexane to afford 3-((4-methoxybenzyl)oxy)-2,6-dinitropyridine (0.9 g, 60%) as off-white solid.

Step-3: To a stirred solution of 3-((4-methoxybenzyl)oxy)-2,6-dinitropyridine (2.0 g) in acetic acid (40.0 mL) was added iron powder (2.5 g) and resulting mixture was stirred at room temperature for 1 hour. After completion of the reaction (monitored by TLC), reaction mass was diluted with ethyl acetate (100 mL). The combined organic layers were washed with water (2×200 mL), dried over anhydrous sodium sulfate and concentrated under reduced pressure to obtain crude 3-((4-methoxybenzyl)oxy)pyridine-2,6-diamine as greenish sticky liquid (1.68 g). Product carried forward to next step without purification.

Step-4: To a stirred solution of NaNO$_2$ (0.33 g) in water (1.5 mL) were added aniline (0.45 g) and 6 N hydrochloric acid (0.23 ml) at 0° C. and the resulting mixture was stirred at 0° C. for 30 minutes. After that, 3-((4-methoxybenzyl)oxy)pyridine-2,6-diamine (0.80 g) in methanol (5.0 mL) was added to reaction mass and then it was stirred at room temperature for 2 h. After completion of reaction (monitored by TLC), it was quenched with sodium acetate and stirred for 15 minutes. The reaction mixture was extracted with ethyl acetate (3×70 mL), washed with water (2×200 mL). Collected organics, were dried over anhydrous sodium sulfate, evaporated under reduced pressure to obtain crude. The crude was purified by flash chromatography using 40% ethyl acetate in hexane to afford (E)-3-((4-methoxybenzyl)oxy)-5-(phenyldiazenyl)pyridine-2,6-diamine (0.43 g, 55.1%) as red solid.

Step-5: To a stirred solution of (E)-3-((4-methoxybenzyl)oxy)-5-(phenyldiazenyl)pyridine-2,6-diamine (0.43 g) in dichloromethane (14.3 mL) was added triethylsilane (0.14 mL) followed by slow and dropwise addition of trifluoroacetic acid (5.7 mL) 0° C. temperature under nitrogen atmosphere. This resulting solution was stirred at room temperature for 20 min. After completion of reaction (monitored by TLC), reaction mass was concentrated under reduced pressure to obtain crude material. The crude was purified by Prep HPLC [XBS column 30% Acetonitrile/TFA] to afford (E)-2,6-diamino-5-(phenyldiazenyl)pyridin-3-ol trifluoroacetic acid salt (0.105 g, 37.2%) as red solid. LCMS: 99.79% (m/z: 230.2 [M+1]+).

1H NMR (400 MHz, DMSO): δ 11.72 (bs, 2H), 9.42 (bs, 1H), 8.99 (bs, 1H), 8.74-8.66 (m, 2H), 7.68 (d, J=8 Hz, 2H), 7.39-7.35 (m, 2H), 7.12-7.08 (m, 1H), 7.06 (s, 1H).

Example-9: Preparation of (E)-2,6-diamino-5-((4-hydroxyphenyl)diazenyl)pyridin-3-ol Trifluoroacetic Acid Salt Step-1: A pre-mixture solution of acetic anhydride (14.0 mL) and nitric acid (6.2 mL) was added drop wisely to a solution of 2-nitropyridin-3-ol (5.0 g) at 0° C. and resulting solution was stirred at 0° C. for 2 h followed by stirring at room temperature for 2 h. After completion of the reaction (monitored by TLC), the reaction mass was quenched with ice water and extracted with dichloromethane (3×150 mL). Collected organics were dried over anhydrous sodium sulfate, evaporated under reduced pressure to obtain crude. This crude was triturated with n-pentane followed by drying under reduced pressure to afford 2,6-dinitropyridin-3-ol (3.4 g, 51%) as yellow solid. The obtained material was used for next step without purification.

Step-2: To a stirred solution of 2,6-dinitropyridin-3-ol (10.0 g) in dimethylformamide (100 mL) was added potassium carbonate (18.6 g) and 4-methoxy benzyl chloride (10.9 g) at 0° C. and resulting mixture was stirred at 50° C. for 16 h. After completion of reaction (monitored by TLC), reaction mass was cooled to room temperature and then poured into ice water (300 mL). Reaction mass was extracted with ethyl acetate (3×150 mL), followed by washings with water (2×500 mL). Collected organics were dried over anhydrous sodium sulfate, evaporated under reduced pressure to obtain crude. The crude was purified by flash chromatography using 30% ethyl acetate in hexane to afford 3-((4-methoxybenzyl)oxy)-2,6-dinitropyridine (0.9 g, 60%) as off-white solid.

Step-3: To a stirred solution of 3-((4-methoxybenzyl)oxy)-2,6-dinitropyridine (2.0 g) in acetic acid (40.0 mL) was added iron powder (2.5 g) and resulting mixture was stirred at room temperature for 1 hour. After completion of the reaction (monitored by TLC), reaction mass was diluted with ethyl acetate (100 mL). The combined organic layers were washed with water (2×200 mL), dried over anhydrous sodium sulfate and concentrated under reduced pressure to obtain crude 3-((4-methoxybenzyl)oxy)pyridine-2,6-diamine as greenish sticky liquid (1.68 g). Product carried forward to next step without purification.

Step-4: To a stirred solution of sodium nitrite (0.33 g) in water (1.5 mL) were added 4-amino phenol (0.533 g) and 6 N hydrochloric acid (0.23 mL) at 0° C. and resulting mixture was stirred at 0° C. temperature for 30 minutes. After that, 3-((4-methoxybenzyl)oxy)pyridine-2,6-diamine (0.800 g) in methanol (5.0 mL) was added to above stirring solution and reaction mixture was stirred at room temperature for 2 h. After completion of reaction (monitored by TLC), reaction mass was quenched with sodium acetate and stirred for 15 min. The reaction mixture was extracted with ethyl acetate (3×70 mL) followed by washings with water (2×200 mL). Collected organics were dried over anhydrous sodium sulfate, evaporated under reduced pressure to obtain crude. The crude was purified by flash chromatography using 45% ethyl acetate in hexane to afford (E)-4-((2,6-diamino-5-((4-methoxybenzyl)oxy)pyridin-3-yl)diazenyl)phenol as red solid (0.37 g, 49.7%).

Step-5: To a stirred solution of (E)-4-((2,6-diamino-5-((4-methoxybenzyl)oxy)pyridin-3-yl)diazenyl) phenol (0.37 g) in dichloromethane (12.3 mL) was added a mixture of triethylsilane (0.12 mL) and trifluoroacetic acid (4.9 mL) drop wisely at 0° C. temperature. Resulting solution was stirred at room temperature for 20 minutes. After completion of reaction (monitored by TLC), reaction mass was concentrated under reduced pressure to obtain crude. The crude was purified by preparative HPLC [XBS column 30% Acetonitrile/TFA] to afford (E)-4-((2,6-diamino-5-((4-methoxybenzyl)oxy)pyridin-3-yl)diazenyl)phenol trifluoroacetic acid salt (0.095 g, 38%) as red solid. LCMS: 99.30% (m/z: 246.11 [M+1]+).

1H NMR (400 MHz, DMSO): 11.79 (bs, 1H), 11.51 (bs, 1H), 9.52 (bs, 1H), 9.19 (bs, 1H), 8.76 (bs, 1H), 8.49-8.38 (m, 2H), 7.55 (d, J=8.8 Hz, 2H), 7.10 (s, 1H), 6.78 (d, J=8.8 Hz, 2H).

Example 10: Radioligand Binding Assay for Bradykinin B1 and B2 Receptor

Bradykinin receptor membrane (B1 & B2) was procured from commercial source. Competitive radioligand binding assay was done by filtration-based technique using membranes prepared from transiently transfected Chinese hamster ovary (CHO)—K1 cells. Briefly, different concentrations of Phenazopyridine (compound I-A) was added to 96 wells plate containing bradykinin membrane along with required controls. The assay plate was harvested onto a GF/B Unifier harvester plate and washed with cold wash buffer. Plate was dried in oven for 15 mins at 60° C. The membrane activity was analyzed based on the readout using MicroBeta from Perkin Elmer in Counts Per Minute (CPM). Percent inhibition of Bradykinin receptor activity was calculated at each concentration and summarized in the results.

TABLE 1

Results Summary

| Sr No. | Concentration (μM) | % Inhibition | |
|---|---|---|---|
| | | Bradykinin B1 Receptor | Bradykinin B2 Receptor |
| 1 | 100.00 | 81 | 98 |
| 2 | 31.65 | ND | 78 |
| 3 | 10.01 | 49 | 59 |
| 4 | 3.17 | ND | 38 |
| 5 | 1.00 | 12 | 37 |
| 6 | 0.32 | ND | 10 |
| 7 | 0.10 | ND | 13 |
| 8 | 0.03 | ND | 6 |

ND = Not determined

Example 11: Preparation of Capsule Dosage Form

TABLE 2

| Ingredients | Qty(mg)/capsule |
|---|---|
| Hydrochloride salt of Compound II | 100 |
| Hydrochloride salt of Compound III | 100 |
| Microcrystalline cellulose | 4.4 |
| povidone | 8.8 |
| sodium alginate | 17.6 |
| Hydroxypropyl methylcellulose | 19.8 |
| colloidal silicon dioxide | 2.2 |
| Magnesium stearate | 2.2 |

1. Hydrochloride salt of compound II and compound III were mixed with microcrystalline cellulose, colloidal silicon dioxide and magnesium stearate in a mixer, such as a high-shear mixer granulator or planetary mixer, to obtain homogeneity.
2. Mixture of step 1 was granulated using water or other suitable granulation fluids.
3. Granules of step 2 were dried.
4. Dried granules of step 3 were milled.
5. Remaining excipients were added to the granules of step 4.
6. Granules of step 5 were blended.
7. Granules of step 6 were filled in capsule.

Example 12: Preparation of Tablet Dosage Form

TABLE 3

| Ingredients | Qty(mg)/tablet |
|---|---|
| Hydrochloride salt of Compound I-A | 100 |
| Hydrochloride salt of Compound III | 50 |

TABLE 3-continued

| Ingredients | Qty(mg)/tablet |
|---|---|
| Polyvinylpyrrolidone | 20 |
| Microcrystalline cellulose | 35 |
| Co povidone | 10 |
| mg stearate | 5 |
| Colloidal silicon dioxide | 6 |

1. Hydrochloride salt of compound I-A and compound III (hydrochloride salt), along with polyvinylpyrrolidone, microcrystalline cellulose, co-povidone, magnesium stearate and colloidal silicon dioxide were passed through a 0.8-mm sieve.
2. Powder of step 1 was mixed to obtain final blend.
3. Final blend of step 2 was compressed to obtain tablet.

Example 13: Preparation of Tablet Dosage Form

TABLE 4

| Ingredients | Qty(mg)/tablet |
|---|---|
| Hydrochloride salt of Compound I-A | 100 |
| Hydrochloride salt of Compound IV | 150 |
| Magnesium aluminium silicate | 26 |
| Sodium starch glycolate | 24 |
| Magnesium stearate | 5 |
| Iso propyl alcohol | q.s. |

1. Hydrochloride salt of cl-A and compound IV along with magnesium aluminium silicate and sodium starch glycolate were passed through 250-μm mesh.
2. The powder mixture of step 1 was granulated using Iso propyl alcohol to obtain wet mass.
3. Granules of step 2 were dried.
4. Dried granules of step 3 were passed through a #11 sieve.
5. Magnesium stearate was passed through a 250-μm sieve.
6. Magnesium stearate of step 5 was mixed to the dried granules of step 4.
7. Granules of step 6 were compressed to obtain tablet.

Example 14: Preparation of Tablet Dosage Form

TABLE 5

| Ingredients | Qty(mg)/tablet |
|---|---|
| Hydrochloride salt of Compound II | 100 |
| Hydrochloride salt of Compound V | 100 |
| Lactose | 180 |
| Povidone | 20 |
| Starch (maize) | 50 |
| Water | 65 |
| Croscarmellose Na | 20 |
| Startch dried | 30 |

1. Hydrochloride salt of compound II and compound V were mixed with lactose, povidone, and starch (maize) using the mixer.
2. Powder mixture of step 1 was passed through a 250-μm sieve aperture screen.
3. Water was added to the powder mixture of step 2 to obtain wet mass.
4. Wet mass of step 3 was passed through a 2.00-mm aperture screen.

5. Wet mass of step 4 was dried in a tray dryer.
6. Granules of step 5 were passed through a 595-μm aperture screen.
7. Croscarmellose sodium and dried starch were passed through a 595-μm aperture screen.
8. Granules of step 6 were blended with powder mixture of step 7.
9. Granules of step 8 were compressed to obtain tablet.

Example 15: Preparation of Tablet Dosage Form

TABLE 6

| Ingredients | Qty(mg)/tablet |
|---|---|
| Hydrochloride salt of Compound IV | 200 |
| Microcrystalline cellulose | 25.880 |
| Croscarmellose sodium | 9.0 |
| Carboxy methylcellulose sodium (CMC sodium) | 1.52 |
| Poloxyl 40 stearate | 1.5 |
| Colloidal silicon dioxide | 0.5 |
| Sodium starch glycolate | 6 |
| Croscarmellose sodium | 7 |
| Magnesium stearate | 0.6 |
| Purified water | 104 |

1. Hydrochloride salt of compound IV, microcrystalline cellulose and croscarmellose sodium were passed through a 630-μm stainless steel sieve.
2. Ingredients of step 1 were mixed using mixture.
3. Poloxyl 40 stearate was dissolved into Purified water at 55° C. to 60° C.
4. Solution of step 3 was cooled at 30° C.
5. Carboxymethylcellulose sodium was dissolved to the solution of step 4.
6. Solution of step 5 was added to powder blend of step 2 to obtain wet mass.
7. Granules of step 6 were sifted in the granulator through a 3.5-mm stainless steel sieve.
8. Granules of step 7 were sifted in the granulator through a 1-mm stainless steel sieve.
9. Granules of step 8 were dried in oven.
10. Dried granules of step 9 were grinded through a 1-mm sieve using a grinder.
11. Colloidal silicon dioxide, Sodium starch glycolate and Croscarmellose sodium were sifted through a 500-μm sieve, using a sifter.
12. Powder mixture of step 11 was blended with dry granules of step 10.
13. Magnesium stearate was sifted through a 250-μm sieve.
14. Magnesium stearate of step 13 was blended with powder mixture of step 12.
15. Granules of step 14 were compressed using a rotary tabletting machine to obtain tablet.

Example 16: Preparation of Parenteral Dosage Form

TABLE 7

| Ingredients | Qty (v/v) |
|---|---|
| Hydrochloride salt of Compound I-A | 100 mg |
| Polyethylene Glycol 300 | 65% |
| Ethanol | q.s. to 1 ml |
| Polysorbate 80 | 4% |

1. Required quantity of PEG 300 were taken into manufacturing vessel.
2. Required quantity of hydrochloride salt of compound I-A was added to step 1 and stirred well till clear solution obtained.
3. Polysorbate 80 was added into solution above and mixed well.
4. The volume was made with Ethanol q.s. of batch size.
5. The solution of step 4 was filtered using 0.2-micron sterile filter.
6. The bulk solution obtained in step 5 was filled into vial, stoppered it will rubber stopper and sealed it.

Example 17: Preparation of Parenteral Dosage Form

TABLE 8

| Ingredients | Qty (v/v) |
|---|---|
| Hydrochloride salt of Compound I-A | 50 mg |
| Hydrochloride salt of Compound IV | 50 mg |
| Polyoxyl 35 castor oil | 65% |
| Ethanol | q.s. to 1 ml |

1. Approximately 20% batch size of ethanol was taken into manufacturing vessel.
2. Required qty of hydrochloride salt of compound I-A and compound IV were added into step 1 and stirred well till clear solution obtained.
3. Cremophore EL was added to step 2 solution and mixed well.
4. The volume was made with Ethanol q.s. of batch size
5. The solution of step 4 was filtered using 0.2-micron sterile filter.
6. The bulk solution obtained in step 5 was filled into vial, stoppered it will rubber stopper and sealed it.

Example 18: Preparation of Parenteral Dosage Form

TABLE 9

| Ingredients | Qty (v/v) |
|---|---|
| Hydrochloride salt of Compound II | 50 mg |
| Hydrochloride salt of Compound V | 50 mg |
| Macrogol 15 hydroxystearate | 400 mg |
| Propylene Glycol | 40% |
| Ethanol | q.s. to 1 ml |

1. Required quantity of propylene glycol was taken into manufacturing vessel.
2. Required qty of hydrochloride salt of compound II and compound V were added into step 1 and stirred well till clear solution obtained.
3. Macrogol 15 hydroxystearate added to step 2 solution and mixed well.
4. The volume was made with Ethanol q.s. of batch size
5. The solution of step 4 was filtered using 0.2-micron sterile filter.
6. The bulk solution obtained in step 5 was filled into vial, stoppered it will rubber stopper and sealed it.

Example 19: Preparation of Parenteral Dosage Form

TABLE 10

| Ingredients | Qty (v/v) |
|---|---|
| Hydrochloride salt of Compound III | 100 mg |
| Acetic acid | q.s. to pH 3.5 |
| Sodium hydroxide | q.s. to pH 3.5 |
| Ethanol | 30% |
| Water for Injection | q.s. to 1 ml |

1. Required quantity of water for injection was taken into manufacturing vessel.
2. Required qty of hydrochloride salt of compound III were added into step 1 and stirred well till clear solution obtained.
3. pH was adjusted using acetic acid or sodium hydroxide to pH 3.5.
4. Required quantity of ethanol was added to step 3 and mixed well.
5. The volume was made with water for injection to batch size and mixed well.
6. The solution of step 5 was filtered using 0.2-micron sterile filter.
7. The bulk solution obtained in step 5 was filled into vial, stoppered it will rubber stopper and sealed it Example 20: Nociceptive Behavioral Scoring Using Von Frey Filaments Test Study Design: Cyclophosphamide (CYP) induced urinary bladder cystitis rat model was to study the effect of desired compounds on urinary bladder pain.

Experimental setup: Groups 1: vehicle control, Group 2: CYP control (150 mg/kg, IP), Group 3: Reference Standard Ibuprofen (300 mg/kg, PO) given 5 min prior to CYP injection, Groups 4 to 8: Test item, treated with test compounds (10 mg/kg, PO), 5 min prior to CYP injection, n=5 rats/group. Nociceptive behavioural scoring was performed using Von Frey filaments test at 0 hr and 4 hr post CYP injection, and data were represented as % pain score.

As represented in FIG. 1, before administration of CYP and reference/test items, all animal show similar pain score. While, as shown in FIG. 2, CYP control animal showed significant increase in % nociceptive pain scores at 4 hours post CYP dosing when compared to vehicle control. Treatment with reference standard Ibuprofen (300 mg/kg, PO, QD) resulted in significant reduction in AUC of % nociceptive pain scores. FIG. 2 shows the % nociceptive pain scores 4 hours post CYP dosing and compounds dosing.

Statistical analysis applied—One-way ANOVA followed by dunnett's multiple comparison test. *$p<0.05$, $p<0.01$, *$p<0.001$, ****$p<0.0001$ vs CYP control

We claim:
1. A method for treatment of interstitial cystitis or painful bladder syndrome which method comprises administering a therapeutically effective amount of compound IV:

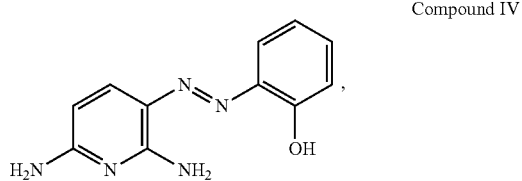 [SMILES: Nc1ccc(/N=N/c2ccccc2O)c(N)n1]

Compound IV or a pharmaceutically acceptable salt or solvate thereof.

* * * * *